(12) United States Patent
Yim

(10) Patent No.: US 10,425,184 B2
(45) Date of Patent: Sep. 24, 2019

(54) DEVICE AND METHOD FOR SOUND WAVE COMMUNICATION

(71) Applicants: DANSOL PLUS CO., LTD., Seoul (KR); Chang Soon Yim, Seoul (KR)

(72) Inventor: Chang Soon Yim, Seoul (KR)

(73) Assignees: DANSOL PLUS CO., LTD., Seoul (KR); Chang Soon Yim, Seoul (KR)

( * ) Notice: Subject to any disclaimer, the term of this patent is extended or adjusted under 35 U.S.C. 154(b) by 301 days.

(21) Appl. No.: 15/509,318

(22) PCT Filed: Mar. 29, 2016

(86) PCT No.: PCT/KR2016/003205
§ 371 (c)(1),
(2) Date: Mar. 7, 2017

(87) PCT Pub. No.: WO2016/190535
PCT Pub. Date: Dec. 1, 2016

(65) Prior Publication Data
US 2017/0288805 A1    Oct. 5, 2017

(30) Foreign Application Priority Data

May 26, 2015 (KR) ........................ 10-2015-0073219

(51) Int. Cl.
*H04L 9/06* (2006.01)
*H04K 1/00* (2006.01)
(Continued)

(52) U.S. Cl.
CPC ............. *H04K 1/003* (2013.01); *H04B 11/00* (2013.01); *H04L 1/0009* (2013.01);
(Continued)

(58) Field of Classification Search
CPC .......... H04K 1/003; H04L 9/06; H04L 9/0625; H04L 9/0861; H04L 1/0009; H04B 11/00; H04W 4/80
See application file for complete search history.

(56) References Cited

U.S. PATENT DOCUMENTS 5,848,027 A     12/1998  Dotter
2008/0243491 A1* 10/2008  Matsuoka ............. H04B 11/00
                                                   704/201

(Continued)

FOREIGN PATENT DOCUMENTS

JP      2007-202088 A     8/2007
JP      2014-116752 A     6/2014
(Continued)

OTHER PUBLICATIONS

Nandakunnar et al., Dhwani: Secure Peer-to-Peer Acoustic NFC, ACM, 2013.*
(Continued)

*Primary Examiner* — Minh Dinh
(74) *Attorney, Agent, or Firm* — Paratus Law Group, PLLC

(57) ABSTRACT

A device for sound wave communication, including: a hardware correction table for setting a correction frequency band; a sound wave transmission unit for generating data frequencies at a predetermined base decibel level, generating separate reception filter frequencies at the base decibel level for receiving data carried by a sound wave transmitted from the nearest location when sound waves are received, and generating the correction reference frequency at the base decibel level for correcting hardware transmission; and a sound wave reception unit for receiving a sound wave signal transmitted from the sound wave transmission unit, extracting decibel levels at each of the data frequencies to form an array of decibel levels, correcting the array by shifting the array by a correction value extracted using the hardware correction table, and reconstructing data.

12 Claims, 16 Drawing Sheets

(51) Int. Cl.
*H04B 11/00* (2006.01)
*H04L 1/00* (2006.01)
*H04L 9/08* (2006.01)

(52) U.S. Cl.
CPC .......... *H04L 9/0625* (2013.01); *H04L 9/0861* (2013.01); *H04L 1/0063* (2013.01)

(56) References Cited

U.S. PATENT DOCUMENTS

| | | | | |
|---|---|---|---|---|
| 2010/0182876 | A1* | 7/2010 | Matsuoka | H04B 1/707 367/135 |
| 2014/0064499 | A1* | 3/2014 | Shim | H04B 11/00 381/58 |
| 2014/0104990 | A1* | 4/2014 | Shim | H04B 11/00 367/197 |
| 2015/0036464 | A1* | 2/2015 | Moriguchi | H04B 11/00 367/137 |
| 2015/0081071 | A1* | 3/2015 | Lea | H04L 27/00 700/94 |
| 2017/0063495 | A1* | 3/2017 | Chen | H04L 1/0083 |

FOREIGN PATENT DOCUMENTS

| | | |
|---|---|---|
| KR | 10-2002-0048314 A | 6/2002 |
| KR | 10-2012-0050186 A | 5/2012 |
| KR | 10-1431392 B1 | 9/2014 |

OTHER PUBLICATIONS

International Search Report for PCT/KR2016/003205 dated Jun. 28, 2016 from Korean Intellectual Property Office.

* cited by examiner

Transmission and reception of sound waves

| Correction value | 3 | 2 | 1 | 0 | -1 | -2 | -3 |
|---|---|---|---|---|---|---|---|
| Correction frequency [Hz] | 18,065 | 18,070 | 18,075 | 18,080 | 18,085 | 18,090 | 18,095 |

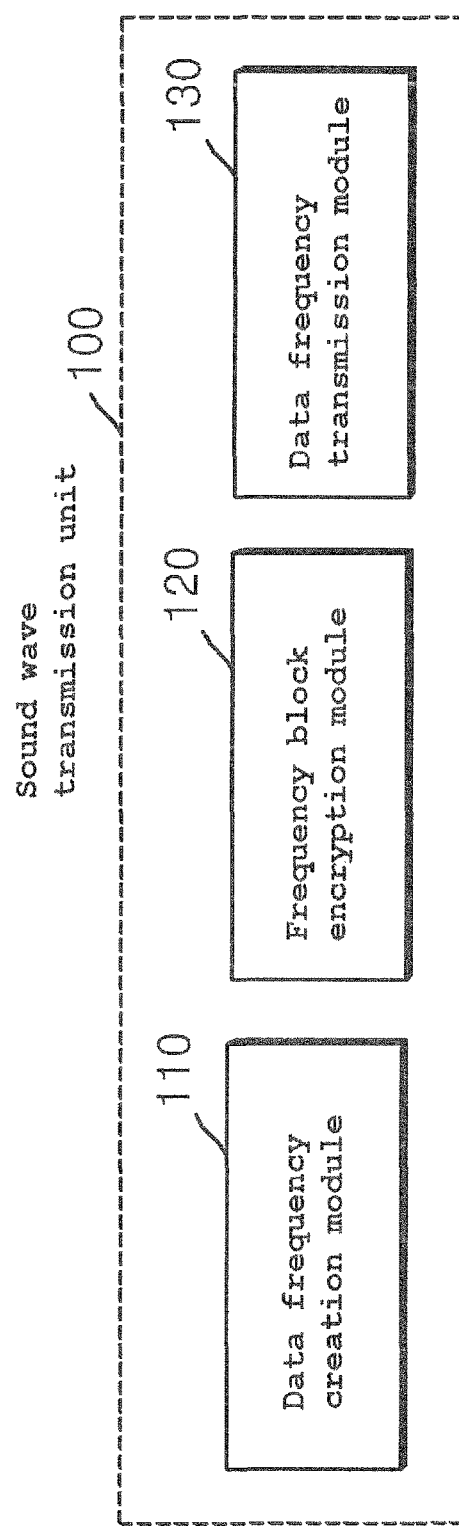

FIG. 5

Y-axis parity check | Parity bit for validation | X-axis parity check

| Data place | | 1 | 2 | 3 | 4 | 5 | Parity |
|---|---|---|---|---|---|---|---|
| Data frequency [Hz] | Parity | | | | | | 18,290 |
| | Hexadecimal $16^0$'s place | 18,130 | 18,170 | 18,210 | 18,250 | | 18,490 |
| | Hexadecimal $16^1$'s place | 18,330 | 18,370 | 18,410 | 18,450 | | 18,690 |
| | Hexadecimal $16^2$'s place | 18,530 | 18,570 | 18,610 | 18,650 | | 18,890 |
| | Hexadecimal $16^3$'s place | 18,730 | 18,770 | 18,810 | 18,850 | | 19,090 |
| | Hexadecimal $16^4$'s place | 18,930 | 18,970 | 19,010 | 19,050 | | 19,290 |
| | Hexadecimal $16^5$'s place | 19,130 | 19,170 | 19,210 | 19,250 | | 19,490 |
| | Hexadecimal $16^6$'s place | 19,330 | 19,370 | 19,410 | 19,450 | | 19,690 |
| | | 19,530 | 19,570 | 19,610 | 19,650 | | |

| Data place | 1 | 2 | 3 | 4 | 5 | 6 | 7 | 8 | ... | 27 | 28 | 29 | 30 | 31 | 32 | 33 | 34 |
|---|---|---|---|---|---|---|---|---|---|---|---|---|---|---|---|---|---|
| Separate reception filter frequency [Hz] | 18,110 | 18,150 | 18,190 | 18,230 | 18,270 | 18,310 | 18,350 | 18,390 | ... | 19,390 | 19,430 | 19,470 | 19,510 | 19,550 | 19,590 | 19,630 | 19,670 |

FIG. 6

Left shift value = 1 (Reference column) + a + c + e + g + i + k
Right shift value = 1 (Reference column) + b + d + f + h + j (a)

| Year | | | | Month | | Day | | Hour | | Minute | |
|---|---|---|---|---|---|---|---|---|---|---|---|
| a | b | c | d | e | f | g | h | i | j | | k |
| 2 | 0 | 1 | 5 | 0 | 4 | 2 | 7 | 1 | | 1 | |
| 2 | 0 | 1 | 5 | 0 | 4 | 2 | 7 | 1 | 0 | 2 | 2 |
| 2 | 0 | 1 | 5 | 0 | 4 | 2 | 7 | 1 | 0 | 2 | 3 |
| 2 | 0 | 1 | 5 | 0 | 4 | 2 | 7 | 1 | 0 | 2 | 4 |
| 2 | 0 | 1 | 5 | 0 | 4 | 2 | 7 | 1 | 0 | 2 | 5 |
| 2 | 0 | 1 | 5 | 0 | 4 | 2 | 7 | 1 | 0 | 2 | 6 |
| 2 | 0 | 1 | 5 | 0 | 4 | 2 | 7 | 1 | 0 | 2 | 7 |
| 2 | 0 | 1 | 5 | 0 | 4 | 2 | 7 | 1 | 0 | 2 | 8 |
| 2 | 0 | 1 | 5 | 0 | 4 | 2 | 7 | 1 | 0 | 2 | 9 |
| 2 | 0 | 1 | 5 | 0 | 4 | 2 | 7 | 1 | 0 | 3 | 0 |
| 2 | 0 | 1 | 5 | 0 | 4 | 2 | 7 | 1 | 0 | 3 | 1 |
| 2 | 0 | 1 | 5 | 0 | 4 | 2 | 7 | 1 | 0 | 3 | 2 |
| 2 | 0 | 1 | 5 | 0 | 4 | 2 | 7 | 1 | 0 | 3 | 3 |

(b)

| shift value | |
|---|---|
| Left shift | Right shift |
| 10 | 18 |
| 11 | 19 |
| 12 | 20 |
| 13 | 21 |
| 14 | 22 |
| 15 | 23 |
| 16 | 24 |
| 17 | 25 |
| 9 | 16 |
| 10 | 17 |
| 11 | 18 |
| 12 | 19 |

FIG. 9

| Data place | 1 | 2 | 3 | 4 | 5 | 6 | 7 | ... | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|
| Binary digit | 0 | 0 | 0 | 0 | 0 | 0 | 0 | ... | 0 | 1 | 0 | 0 | 1 | 1 | 0 | 1 | 0 | 0 | 1 | 0 | 0 | 1 |
| Data frequency [Hz] | 18,130 | 18,180 | 18,230 | 18,280 | 18,330 | 18,380 | 18,430 | ... | 19,130 | 19,180 | 19,230 | 19,280 | 19,330 | 19,380 | 19,430 | 19,480 | 19,530 | 19,580 | 19,630 | 19,680 | 19,730 | 19,780 |
| Separate reception filter frequency [Hz] | 18,100 | 18,150 | 19,200 | 18,250 | 18,300 | 18,350 | 19,400 | ... | 19,100 | 19,150 | 19,200 | 19,250 | 19,300 | 19,350 | 19,400 | 19,450 | 19,500 | 19,550 | 19,600 | 19,650 | 19,700 | 19,750 |

Parity bit for validation

Since the number of data frequency transmission is six, transmit the sixth separate reception filter frequency.

| Correction value | 3 | 2 | 1 | 0 | -1 | -2 | -3 |
|---|---|---|---|---|---|---|---|
| Correction frequency [Hz] | 18,065 | 18,070 | 18,075 | 18,080 | 18,085 | 18,090 | 18,095 |

FIG. 10

Y-axis parity check ← | → Parity bit for validation
X-axis parity check

| Data place | | 1 | 2 | 3 | 4 | 5 |
|---|---|---|---|---|---|---|
| | Parity | 18,130 | 18,170 | 18,210 | 18,250 | 18,290 |
| | Binary parity | 0 | 0 | 0 | 0 | 0 |
| [Hz] | Hexadecimal 16⁰'s place | 18,330 | 18,370 | 18,410 | 18,450 | 18,490 |
| | Binary 2⁰'s place | 1 | 1 | 1 | 1 | 0 |
| | Hexadecimal 16¹'s place | 18,530 | 18,570 | 18,610 | 18,650 | 18,690 |
| | Binary 2¹'s place | 0 | 0 | 0 | 0 | 0 |
| Data frequency | Hexadecimal 16²'s place | 18,730 | 18,770 | 18,810 | 18,850 | 18,890 |
| | Binary 2²'s place | 0 | 0 | 0 | 0 | 0 |
| | Hexadecimal 16³'s place | 18,930 | 18,970 | 19,010 | 19,050 | 19,090 |
| | Binary 2³'s place | 0 | 0 | 0 | 0 | 0 |
| | Hexadecimal 16⁴'s place | 19,130 | 19,170 | 19,210 | 19,250 | 19,290 |
| | Binary 2⁴'s place | 0 | 0 | 0 | 0 | 0 |
| | Hexadecimal 16⁵'s place | 19,330 | 19,370 | 19,410 | 19,450 | 19,490 |
| | Binary 2⁵'s place | 0 | 0 | 0 | 0 | 0 |
| | Hexadecimal 16⁶'s place | 19,530 | 19,570 | 19,610 | 19,650 | 19,690 |
| | Binary 2⁶'s place | 1 | 1 | 1 | 1 | 0 |

| Data place | 1 | 2 | 3 | 4 | 5 | 6 | 7 | ... | 27 | 28 | 29 | 30 | 31 | 32 | 33 | 34 |
|---|---|---|---|---|---|---|---|---|---|---|---|---|---|---|---|---|
| Separate reception filter frequency [Hz] | 18,110 | 18,150 | 18,190 | 18,230 | 18,270 | 18,310 | 18,350 | ... | 19,390 | 19,430 | 19,470 | 19,510 | 19,550 | 19,590 | 19,630 | 19,670 |

| Correction value | 3 | 2 | 1 | 0 | -1 | -2 | -3 |
|---|---|---|---|---|---|---|---|
| Correction frequency [Hz] | 18,065 | 18,070 | 18,075 | 18,080 | 18,085 | 18,090 | 18,095 |

Since the number of data frequency transmission is eight, transmit the eighth separate reception filter frequency.

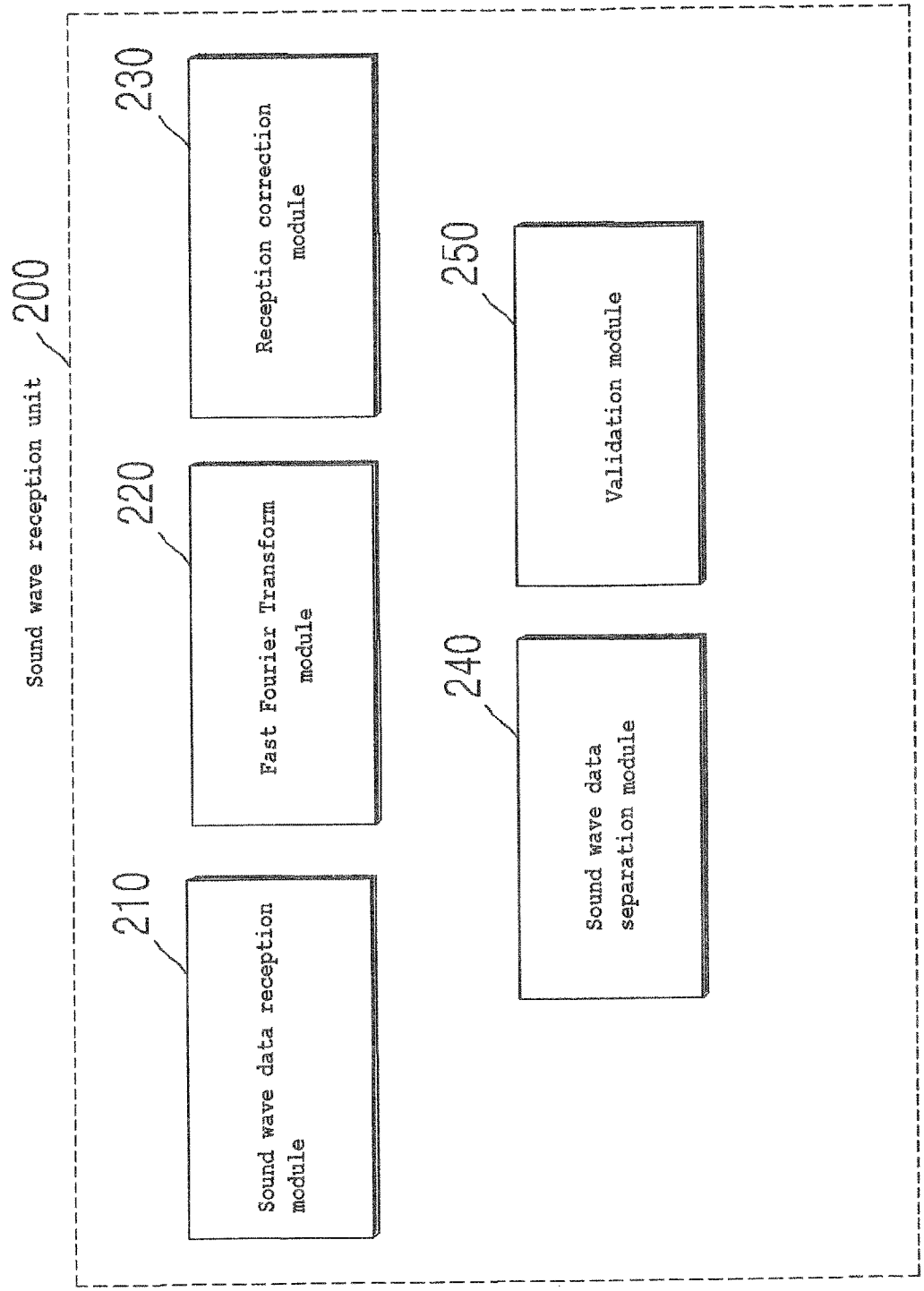

FIG. 12

| Array factor | 1 | 2 | 3 | 4 | 5 | 6 | 7 | 8 | ...... | 354 | 355 | 356 | 357 | 358 | 359 | 360 | 361 |
|---|---|---|---|---|---|---|---|---|---|---|---|---|---|---|---|---|---|
| Frequency value [Hz] | 18,000 | 18,005 | 18,010 | 18,015 | 18,020 | 18,025 | 18,030 | 18,035 | ...... | 19,765 | 19,770 | 19,775 | 19,780 | 19,785 | 19,790 | 19,795 | 19,800 |
| Decibel level | 0 | 0 | 0 | 0 | 0 | 0 | 0 | 0 | ...... | 0 | 0 | 0 | 0 | 0 | 0 | 0 | 0 |

Magnitude of frequency signal

FIG. 13

| Array factor | 1 | 2 | 3 | 4 | 5 | 6 | 7 | 8 | ...... | 354 | 355 | 356 | 357 | 358 | 359 | 360 | 361 |
|---|---|---|---|---|---|---|---|---|---|---|---|---|---|---|---|---|---|
| Frequency value [Hz] | 18,000 | 18,005 | 18,010 | 18,015 | 18,020 | 18,025 | 18,030 | 18,035 | ...... | 19,765 | 19,770 | 19,775 | 19,780 | 19,785 | 19,790 | 19,795 | 19,800 |
| Decibel level | 0 | 0 | 0 | 0 | 0 | 0 | 0 | 0 | ...... | 0 | 0 | 0 | 0 | 0 | 0 | 0 | 0 |

| Correction value | 3 | 2 | 1 | 0 | -1 | -2 | -3 |
|---|---|---|---|---|---|---|---|
| Correction frequency [Hz] | 18,065 | 18,070 | 18,075 | 18,080 | 18,085 | 18,090 | 18,095 |
| Decibel level | 0 | 0 | 0 | 12 | 0 | 0 | 0 |

FIG. 14

| Array factor | 1 | 2 | 3 | 4 | 5 | 6 | 7 | 8 | ...... | 354 | 355 | 356 | 357 | 358 | 359 | 360 | 361 |
|---|---|---|---|---|---|---|---|---|---|---|---|---|---|---|---|---|---|
| Frequency value[Hz] | 18,000 | 18,005 | 18,010 | 18,015 | 18,020 | 18,025 | 18,030 | 18,035 | ...... | 19,765 | 19,770 | 19,775 | 19,780 | 19,785 | 19,790 | 19,795 | 19,800 |
| Decibel level | 0 | 0 | 0 | 0 | 0 | 0 | 0 | 0 | ...... | 0 | 0 | 0 | 0 | 0 | 0 | 0 | 0 |

Move all decibel levels by −1 array factor

| Correction value | 3 | 2 | 1 | 0 | −1 | −2 | −3 |
|---|---|---|---|---|---|---|---|
| Correction frequency[Hz] | 18,065 | 18,070 | 18,075 | 18,080 | 18,085 | 18,090 | 18,095 |
| Decibel level | 0 | 0 | 0 | 0 | 12 | 0 | 0 |

FIG. 15

| Array factor | 1 | 2 | 3 | 4 | 5 | 6 | 7 | ...... | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|
| Data frequency[Hz] | 18,130 | 18,180 | 18,230 | 18,280 | 18,330 | 18,380 | 18,430 | ...... | 19,130 | 19,180 | 19,230 | 19,280 | 19,330 | 19,380 | 19,430 | 19,480 | 19,530 | 19,580 | 19,630 | 19,680 | 19,730 | 19,780 |
| Data frequency decibel level | 0 | 0 | 0 | 0 | 0 | 0 | 0 | ...... | 0 | 0 | 0 | 0 | 0 | 0 | 0 | 0 | 0 | 0 | 0 | 0 | 0 | 0 |
| Separate reception filter frequency[Hz] | 18,100 | 18,150 | 18,200 | 18,250 | 18,300 | 18,350 | 18,400 | ...... | 19,100 | 19,150 | 19,200 | 19,250 | 19,300 | 19,350 | 19,400 | 19,450 | 19,500 | 19,550 | 19,600 | 19,650 | 19,700 | 19,750 |
| Separate reception filter decibel level | 0 | 0 | 0 | 0 | 0 | 0 | 0 | ...... | 0 | 0 | 0 | 0 | 0 | 0 | 0 | 0 | 0 | 0 | 0 | 0 | 0 | 0 |

| Array factor | 1 | 2 | 3 | 4 | 5 | 6 | 7 | ... | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|
| Data frequency [Hz] | 18,130 | 18,180 | 18,230 | 18,280 | 18,330 | 18,380 | 18,430 | ... | 19,130 | 19,180 | 19,230 | 19,280 | 19,330 | 19,380 | 19,430 | 19,480 | 19,530 | 19,580 | 19,630 | 19,680 | 19,730 | 19,780 |
| Data frequency decibel level | - | - | - | - | - | - | - | ... | - | - | - | - | - | - | - | - | - | - | - | - | - | - |
| Separate reception filter frequency [Hz] | 18,100 | 18,150 | 18,200 | 18,250 | 18,300 | 18,350 | 18,400 | ... | 19,100 | 19,150 | 19,200 | 19,250 | 19,300 | 19,350 | 19,400 | 19,450 | 19,500 | 19,550 | 19,600 | 19,650 | 19,700 | 19,750 |
| Separate reception filter decibel level | - | - | - | - | - | - | - | ... | - | - | - | - | - | - | - | - | - | - | - | - | - | - |

Extract array factor having highest decibel level

DEVICE AND METHOD FOR SOUND WAVE COMMUNICATION

CROSS REFERENCE TO PRIOR APPLICATIONS

This application is a National Stage Patent Application of PCT International Patent Application No. PCT/KR2016/003205 (filed on Mar. 29, 2016) under 35 U.S.C. § 371, which claims priority to Korean Patent Application No. 10-2015-0073219 (filed on May 26, 2015), which are all hereby incorporated by reference in their entirety.

BACKGROUND

The present invention relates to a device and a method for sound wave communication, which transmit and receive sound waves to exchange data.

To activate games and chatting using near field communication such as Wi-Fi, Bluetooth or the like, a near field communication method that can be used only through software download without adding a separate device is needed in almost all mobile communication terminals currently used in public. From a viewpoint that a mobile communication terminal is basically provided with a voice communication function, communication using sound waves may be an effective alternative.

Further, in many cases, sound wave communication may implement low power communication in comparison with RF communications such as Bluetooth and the like. A sound wave communication is disclosed in U.S. Pat. No. 5,848,027 filed by Biometrics, Inc. The patent discloses a method and a system for transmitting digital data to a personal computer (PC) using beep sounds of a portable terminal such as a digital display wrist watch or the like.

This system uses Continuous Waveform (CW) modulation such as Binary Frequency Shift Keying (BFSK) modulation, Amplitude Shift Keying (ASK) modulation or the like.

The BFSK modulation is a method of allocating '0' and '1' to sound waves of two specific frequencies respectively, and the CW modulation is a method of allocating '1' if a sound of a specific intensity or higher is continued for a specific time period and allocating '0' if a state without a sound is continued for a specific time period regardless of frequency. A communication performed in such modulation methods may transmit only data of 1 bit on two types of sound waves during a specific unit time.

Since sound waves used in a general mobile communication terminal has a considerably low frequency compared with radio waves, a unit time, which is a time for distinguishing data arrays to be transmitted, is quite long compared with the radio waves. Accordingly, if only 1 bit is transmitted during a unit time using only two types of sound waves as shown in U.S. Pat. No. 5,848,027, the transmission speed will be apparently low.

To solve such a problem, a communication method using sound waves having a variety of frequency sounds, rather than using only the two types of sound waves, has been proposed. That is, the communication is accomplished by determining a sound pitch frequency used for music as a frequency sound used for the communication, matching a data digital value to each sound pitch frequency, and transmitting and decoding various frequency sounds. In this manner, a plurality of bits is transmitted per unit time.

However, in performing the sound wave communication using binary bits or bits exceeding the binary bits as described above, there is a disadvantage in that hardware characteristics are not considered. That is, there may be a problem in that when a sound wave is transmitted through a speaker, the sound wave may be transmitted on another frequency having a slight error, not a reference frequency originally set according to the hardware characteristic of the speaker, and since a microphone receiving the sound wave demodulates the original reference frequency, a correct data may not be received.

Further, an existing sound wave communication has a problem in that since there is no reference for separating data when signals different from each other are generated in the same region due to the characteristic of the sound wave, a data cannot be received when a plurality of sound waves are duplicated.

SUMMARY

Therefore, the present invention has been made in view of the above problems, and it is an object of the present invention to correct an error generated by the hardware characteristic. Another object is to correctly receive a data transmitted from a nearest location even when a plurality of sound waves are duplicated.

To accomplish the above objects, according to one aspect of the present invention, there is provided a sound wave communication device comprising: a hardware correction table for setting a correction frequency band, in which a correction frequency is allocated to each correction value for correcting an error according to a hardware characteristic of a sound wave transmission unit, and allocating a correction reference frequency to correction value '0'; the sound wave transmission unit for generating data frequencies allocated to data places at a predetermined base decibel level, generating a separate reception filter frequency, at the base decibel level, for receiving a data loaded on a sound wave transmitted from a nearest location when sound waves are received, and generating the correction reference frequency for hardware transmission correction at the base decibel level; and a sound wave reception unit for receiving a sound wave signal transmitted from the sound wave transmission unit, extracting a decibel for each data frequency to arrange the decibel in an array, performing correction by shifting the array as much as the extracted correction value using the hardware correction table, and restoring data by extracting array factors in descending order of decibels of the data frequencies, as many as the number of array factors allocated to the separate reception filter frequency having a highest decibel from a band of separate reception filter frequencies.

The sound wave transmission unit may include: a data frequency creation module for creating a sound wave transmission and reception array having the number of data places adding the number of binary transmission data and the number of parity bits as an array factor, creating a data frequency block allocating different data frequencies having regular intervals to the data places, and creating a separate reception filter frequency block allocating different separate reception filter frequencies to the data places; and a data frequency transmission module for converting a data to be transmitted into a binary number, generating data frequencies allocated to data places having a converted value of '1' at the set base decibel level, generating a separate reception filter frequency allocated to a data place corresponding to the number of data having a converted value of '1' at the base decibel level, and generating a correction reference frequency for hardware transmission correction at the base decibel level.

The sound wave transmission unit may include a frequency block encryption module for encrypting by creating an encryption key, creating an encryption left shift value and an encryption right shift value using the created encryption key, replacing frequencies by moving frequencies allocated to odd columns, among data places of a frequency block configured of a data frequency block and a separate reception filter frequency block, to a left side as much as the encryption left shift value, and replacing frequencies by moving frequencies allocated to even columns among the data places of the frequency block to a right side as much as the encryption right shift value, wherein the data frequency transmission module may perform frequency transmission for the frequencies allocated to the data places of the encrypted frequency block.

The encryption key may be created by combining time components of a timer embedded in the sound wave transmission unit or time components of a server connected to a network, and the encryption left shift value may be calculated by adding either the odd columns or the even columns of the encryption key, and the encryption right shift value may be created by adding the other columns of the encryption key.

A separate reception filter frequency allocated to an N-th data place may be a frequency in a middle between a data frequency allocated to an N−1-th data place and a data frequency allocated to an N+1-th data place.

The sound wave reception unit may include: a Fast Fourier Transform module for extracting decibels by performing Fast Fourier Transform (FFT) on the received sound wave signal at predetermined sampling intervals and allocating the decibels in a sampling frequency array; a reception correction module for determining a frequency detecting a highest decibel in the correction frequency band as a correction frequency and performing reception correction by moving decibels allocated in the sampling frequency array as much as a correction value allocated to the correction frequency; a decryption module for creating a decryption left shift value and a decryption right shift value using the encryption key, replacing frequencies by moving frequencies allocated to the odd columns, among array factors of the sound wave transmission and reception array, to a left side as much as the decryption left shift value, replacing frequencies by moving frequencies allocated to the even columns, among the array factors of the sound wave transmission and reception array, as much as the decryption right shift value, and then extracting a data frequency and a decibel allocated to the data frequency from the reception corrected sampling frequency array, extracting a separate reception filter frequency and a decibel allocated to the separate reception filter frequencies from the reception corrected sampling frequency array, and arranging the extracted values in the sound wave transmission and reception array; and a sound wave data separation module for restoring data by extracting a separate reception filter frequency having a highest decibel among decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency.

The sound wave communication device may further comprise a validation module for performing validation of the restored data using a parity bit in the data restored through the sound wave data separation module.

According to another aspect of the present invention, there is provided a sound wave communication method comprising: a hardware correction table creation process of setting a correction frequency band in which a correction frequency is allocated to each correction value for correcting an error according to a hardware characteristic of a speaker transmitting a sound wave and creating a hardware correction table by allocating a correction reference frequency to correction value '0'; a sound wave transmission process of creating a data frequency block for allocating a data to each data frequency and creating a separate reception filter frequency block for receiving a data loaded on a sound wave transmitted from a nearest location when the sound wave is received; and a sound wave reception process of receiving a sound wave signal transmitted from the sound wave transmission unit, extracting a decibel for each data frequency to arrange the decibel in an array, performing correction by shifting the array as much as an extracted correction value using the hardware correction table, and restoring data by extracting array factors in descending order of decibels of the data frequencies, as many as the number of array factors allocated to a separate reception filter frequency having a highest decibel among a band of separate reception filter frequencies.

The sound wave transmission process may include: a frequency block creation step of creating a sound wave transmission and reception array having the number of data places adding the number of binary transmission data and the number of parity bits as an array factor, creating a data frequency block allocating different data frequencies having regular intervals to the data places, and creating a separate reception filter frequency block allocating different separate reception filter frequencies to the data places; and a frequency transmission step of converting a data to be transmitted into a binary number, generating data frequencies allocated to data places having a converted value of '1' at a set base decibel level, generating a separate reception filter frequency allocated to a data place corresponding to the number of data having a converted value of '1' at the base decibel level, and generating a correction reference frequency for hardware transmission correction at the base decibel level.

The sound wave communication method may further comprise, between the frequency block creation step and the frequency transmission step, an encryption step of encrypting by creating an encryption key, creating an encryption left shift value and an encryption right shift value using the created encryption key, replacing frequencies by moving frequencies allocated to odd columns, among data places of a frequency block configured of a data frequency block and a separate reception filter frequency block, to a left side as much as the encryption left shift value, and replacing frequencies by moving frequencies allocated to even columns among the data places of the frequency block to a right side as much as the encryption right shift value, wherein the frequency transmission step is performed for frequencies allocated to data places of the encrypted frequency block.

The sound wave reception process may include: a Fast Fourier Transform step of extracting decibels by performing Fast Fourier Transform (FFT) on the received sound wave signal at predetermined sampling intervals and allocating the decibels in a sampling frequency array; a reception correction step of determining a frequency detecting a highest decibel in the correction frequency band as a correction frequency and performing reception correction by moving decibels allocated in the sampling frequency array as much as a correction value allocated to the correction frequency; a decryption step of creating a decryption left shift value and a decryption right shift value using the encryption key, replacing frequencies by moving frequencies allocated to the odd columns, among array factors of the sound wave transmission and reception array, to a left side as much as the decryption left shift value, replacing frequencies by moving frequencies allocated to the even columns, among the array factors of the sound wave transmission and reception array, as much as the decryption right shift value, and then extracting a data frequency and a decibel allocated to the data frequency from the reception corrected sampling frequency array, extracting a separate reception filter frequency and a decibel allocated to the separate reception filter frequencies from the reception corrected sampling frequency array, and arranging the extracted values in the sound wave transmission and reception array; and a sound wave data separation step of restoring data by extracting a separate reception filter frequency having a highest decibel among decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency.

The sound wave communication method may further comprise, after the sound wave data separation step, a validation step of performing validation of the restored data using a parity bit in the data restored through the sound wave data separation module.

According to an embodiment of the present invention, when a sound wave is transmitted through a speaker, the sound wave may be transmitted on another frequency having a slight error, not a reference frequency originally set according to the hardware characteristic of the speaker, and a reception terminal receiving the sound wave may receive a correct data through a reception correction. Further, a data can be received correctly even when a plurality of sound waves are duplicated.

BRIEF DESCRIPTION OF THE DRAWINGS

FIG. 3 is a block diagram showing the configuration of a sound wave transmission unit according to an embodiment of the present invention.

FIG. 4 is a table showing a frequency block according to an embodiment of the present invention.

FIG. 5 is a view showing tables illustrating an example of creating a hexadecimal frequency block by a data frequency creation module according to an embodiment of the present invention.

FIG. 6 is a view showing tables illustrating an example of creating an encryption key and shift values according to an embodiment of the present invention.

FIG. 9 is a view showing tables illustrating an example of converting a decimal data into a binary data and generating a frequency loaded with the data according to an embodiment of the present invention.

FIG. 10 is a view showing tables illustrating an example of converting a hexadecimal data into a binary data and generating a frequency loaded with the data according to an embodiment of the present invention.

FIG. 11 is a block diagram showing the configuration of a sound wave reception unit according to an embodiment of the present invention.

FIG. 12 is a table sequentially storing only the frequency bands corresponding to sound wave communication in a sampling frequency array having a frequency interval according to an embodiment of the present invention.

FIG. 13 is a view showing tables illustrating a view of using a column detecting the highest decibel value of the reception correction area data as a correction value according to an embodiment of the present invention.

FIG. 14 is a view showing tables illustrating a view of using a correction value of '−1' according to an embodiment of the present invention.

FIG. 15 is a table showing decibel values of a previously defined reception filter band according to an embodiment of the present invention.

FIG. 16 is a view showing a decryption process accomplished by moving data frequencies using shift values according to an embodiment of the present invention.

FIG. 18 is a table showing a view of extracting a separate reception filter frequency having the highest decibel among the decibels allocated to the separate reception filter frequencies from a decrypted sound wave transmission and reception array, and extracting array factors in descending order of decibels of the data frequencies, as many as the number of array factors of a sound wave transmission and reception array allocated to the extracted separate reception filter frequency according to an embodiment of the present invention.

DETAILED DESCRIPTION

Figures 1, 2:
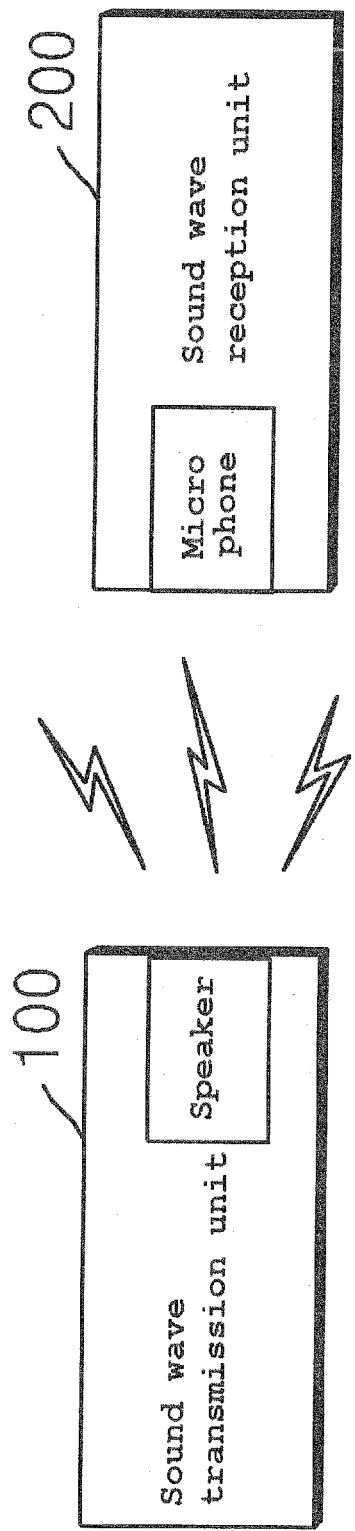
FIG. 1 is a block diagram showing the configuration of a sound wave communication device according to an embodiment of the present invention.
FIG. 2 is a view showing an example of a hardware correction table according to an embodiment of the present invention.

In order to describe the present invention in detail so that those skilled in the art may easily embody the present invention, the most preferred embodiments of the present invention will be hereafter described in detail with reference to the accompanying drawings. Other objects, features and operational advantages including the objects and operational effects of the present invention will become more apparent from the following description of the preferred embodiments. In assigning reference numerals to constitutional components, it should be noted that the same reference numerals are assigned to the same constitutional components if possible although the components are shown in different drawings.

FIG. 1 is a block diagram showing the configuration of a sound wave communication device according to an embodiment of the present invention, and FIG. 2 is a view showing an example of a hardware correction table according to an embodiment of the present invention.

A sound wave communication device may include a hardware correction table, a sound wave transmission unit 100 and a sound wave reception unit 200.

The hardware correction table is a memory table for setting a correction frequency band, in which a correction frequency is allocated to each correction value for correcting an error according to the hardware characteristic of the sound wave transmission unit 100 as shown in FIG. 2, and allocating a correction reference frequency to correction value '0'. When a sound wave signal is transmitted, the sound wave may be transmitted on another frequency having a slight error, not on the originally set reference frequency, according to the hardware characteristic, and the same hardware correction table is provided in both the sound wave transmission unit 100 and the sound wave reception unit 200 to correct the error according to the hardware characteristic. A correction frequency allocated to correction value '0' will be referred to as a correction reference frequency. An example of the hardware correction table is shown in FIG. 2. Referring to FIG. 2, it is understood that a correction frequency band has a band of 18,065 to 18,095 Hz and has a correction value of 3 at 18,065 Hz, a correction value of 2 at 18,070 Hz, a correction value of 1 at 18,075 Hz, a correction value of 0 at 18,080 Hz, a correction value of −1 at 18,085 Hz, a correction value of −2 at 18,090 Hz, and a correction value of −3 at 18,095 Hz since the correction frequency is allocated every 5 Hz. Accordingly, 18,080 Hz having a correction value of 0 corresponds to the correction reference frequency.

The same correction values of the hardware correction table are stored in the sound wave transmission unit 100 and the sound wave reception unit 200.

The sound wave transmission unit 100 generates data frequencies allocated to data places having a binary digit of '1' at a predetermined base decibel level, generates a separate reception filter frequency, at the base decibel level, for receiving a data loaded on a sound wave transmitted from a nearest location when sound waves are received, and transmits a sound wave through a speaker.

The sound wave transmission unit 100 transmits the sound wave after initiating a microphone of the sound wave reception unit 200. The microphone is preferably manufactured as an element of a low impedance. The sound wave is a signal loaded on a sound wave frequency band, for example, between 18,000 and 19,800 Hz.

Particularly, the sound wave transmission unit 100 of the present invention provides a hardware characteristic error correction means for correcting an error generated by a hardware characteristic, and a duplicate sound wave separating means for extracting and receiving only a sound wave transmitted from a nearest sound wave transmission unit 100 when duplicate sound waves are received by transmission of sound waves from a plurality of sound wave transmission units 100.

The sound wave transmission unit 100 selects, as a hardware characteristic error correction means, a correction frequency for hardware transmission correction and transmits the frequency at a base decibel level.

In addition, an existing sound wave communication has a problem in that since there is no reference for separating data when signals different from each other are generated in the same region due to the characteristic of the sound wave, a data cannot be received when a plurality of sound waves are duplicated. To solve this problem, the sound wave transmission unit 100 of the present invention generates, as a duplicate sound wave separating means, data frequencies allocated to data places having a binary digit of '1' at a predetermined base decibel level, generates a separate reception filter frequency, at the base decibel level, for receiving a data loaded on a sound wave transmitted from a nearest location when the sound wave is received, and transmits a sound wave through a speaker. Hereinafter, the sound wave transmission unit 100 will be described in detail with reference to FIG. 3.

The sound wave reception unit 200 receives a sound wave signal transmitted through the speaker of the sound wave transmission unit 100 and restores data. Particularly, the sound wave reception unit 200 of the present invention performs correction considering the characteristic of the speaker transmitting the sound wave and, in addition, may restore data by extracting only a sound wave transmitted from a nearest location among duplicated sound wave signals. To this end, the sound wave reception unit 200 receives a sound wave signal transmitted from the sound wave transmission unit 100, extracts a decibel for each data frequency to arrange the decibel in an array, performs correction by shifting the array as much as the extracted correction value using the hardware correction table, and restores data by extracting array factors in descending order of decibels of the data frequencies, as many as the number of array factors allocated to the separate reception filter frequency having the highest decibel from a band of separate reception filter frequencies. This will be described in detail.

FIG. 3 is a block diagram showing the configuration of a sound wave transmission unit 100 according to an embodiment of the present invention.

The sound wave transmission unit 100 may include a data frequency creation module 110, a frequency block encryption module 120 and a data frequency transmission module 130.

The data frequency creation module 110 may selectively create a data frequency of a binary data frequency block or a hexadecimal data frequency block.

First, an example of creating a binary data frequency block is described in detail with reference to FIG. 4.

Creation of a binary frequency block includes creation of a data frequency block for receiving data of a binary format and a separate reception filter frequency block allocating a separate reception filter frequency for receiving data of a close location when the data are transmitted from the same area.

To this end, the data frequency creation module 110 may create a sound wave transmission and reception array having the number of data places adding the number of binary transmission data and the number of parity bits as an array factor, create a data frequency block allocating different data frequencies having regular intervals to the data places, and create a separate reception filter frequency block allocating different separate reception filter frequencies to the data places.

For example, referring to FIG. 4, the data frequency creation module 110 creates a block having thirty four array factors in total and creates a data frequency block and a separate reception filter frequency block respectively having data frequencies of 50 Hz intervals.

If the frequency interval is adjusted according to the size of a data to be transmitted, a further larger data can be transmitted, and the last two blocks are used as parity areas for validation.

A reception filter frequency for separation of a sound wave signal duplicately received due to transmission of a plurality of speakers uses a frequency in the middle between data frequency intervals. A frequency in the middle between a data frequency allocated to the N−1-th data place and a data frequency allocated to the N+1-th data place is used as the separate reception filter frequency allocated to the N-th data place. Referring to the example of FIG. 4, 32nd power of two unique values may be transmitted using two blocks for validation of thirty two blocks for data transmission. Accordingly, $2^{32}$=4,294,967,296 valid codes may be transmitted.

The 33rd block at the last of the data frequency block shown in FIG. 4 is a parity detection frequency, and it is generated if a remainder of dividing a sum of the number of frequencies generated from odd blocks by two is '1', and it is not generated if the remainder is '0'. The 34-th block at the last of the data frequency block shown in FIG. 4 is a parity detection frequency, and it is generated if a remainder of dividing a sum of the number of frequencies generated from even blocks by two is '1', and it is not generated if the remainder is '0'.

The reception filter frequency generates one unique frequency when a data is transmitted and expresses the number of frequencies generated from the first to 34-th data transmission blocks. For example, when the frequency is generated in a binary format of '11111111111111111111111111111111' (32 data frequencies and two parity frequencies), a frequency of 19,750 Hz corresponding to total thirty four blocks is generated.

Meanwhile, although binary frequency transmission may create further more combinations within a limited frequency range compared with hexadecimal frequency transmission, it is preferable to create hexadecimal frequency blocks of strengthened validation in a place of extremely much frequency interference. Hereinafter, an example of creating a hexadecimal frequency block by the data frequency creation module 110 will be described with reference to FIG. 5.

Creation of a hexadecimal frequency block includes creation of a data frequency block for receiving data of a hexadecimal format and a sound wave data separate reception filter frequency block for receiving data of a close location when data are transmitted from the same area.

Seeing the example of a data frequency block of FIG. 5, total 5×8=40 blocks are created, and frequencies are arranged by the unit of 40 Hz.

If the frequency interval is adjusted according to the size of a data to be transmitted and the hexadecimal places are increased, a further larger data can be transmitted, and the uppermost row and the rightmost column are used as parity areas for validation.

A reception filter frequency for separation of a sound wave signal duplicately received due to transmission of a plurality of speakers uses a frequency in the middle of a data frequency interval (the same as creating a binary frequency block). FIG. 5 shows an example of creating a frequency block for transmitting a data that can express up to FFFFFFF, which is seven hexadecimal digits.

In the Y-axis parity check on the data frequency of FIG. 5, a frequency is generated if a remainder of dividing a sum of the columns of a transmitted frequency block by two is '1', and the frequency is not generated if the remainder is '0'. In the X-axis parity check, a frequency is generated if a remainder of dividing a sum of the rows of a transmitted frequency block by two is '1', and the frequency is not generated if the remainder is '0'. A frequency of parity check is generated if a remainder of dividing a sum of blocks generating the Y-axis parity and the X-axis parity by two is '1', and the frequency is not generated if the remainder is '0'.

In the same manner as creating a binary frequency block, when a hexadecimal frequency block is created, one reception filter frequency is uniquely created when a data is transmitted and expresses the number of generated frequencies of data transmission blocks 1 to 34.

Although an example of a binary frequency block will be described hereinafter, it will be apparent that the present invention may also be applied to a hexadecimal frequency block.

The frequency block encryption module 120 has a problem in that the binary or hexadecimal frequency block can be exposed and used for malicious purposes. To solve this problem, the present invention enhances security by changing the frequency of a frequency block in real-time. That is, although a generated frequency is exposed, the present invention may solve the problem of being used for malicious purposes by implementing to randomly change and transmit a frequency value of a frequency block.

To this end, the frequency block encryption module 120 encrypts a frequency block by creating an encryption left shift value and an encryption right shift value using a created encryption key, replacing frequencies by moving the frequencies allocated to either the odd columns or the even columns, among the data places of the frequency block configured of a data frequency block and a separate reception filter frequency block, to the left side as much as the encryption left shift value, and replacing frequencies by moving the frequencies allocated to the columns that have not been moved to the left side, among the data places of the frequency block, to the right side as much as the encryption right shift value.

Describing in detail, a sound wave communication transmitter through software (S/W) creates an encryption key using a time of a central server or a local server in combination of year+month+day+hour+minute. A transmitter through an independent hardware (H/W) sound wave generator creates an encryption key using a time of an embedded timer in combination of year+month+day+hour+minute. The encryption key is created by combining time components of a timer embedded in the sound wave transmission unit 100 or time components of a server connected to a network. For example, the encryption key may have a format of YYYYMMDDhhmm (201504271202).

Then, the encryption left shift value is calculated by adding either the odd columns or the even columns of the encryption key, and the encryption right shift value is created by adding the other columns of the encryption key.

For example, if it is assumed that there is an encryption key created in combination of time as shown in FIG. 6(*a*), left shift values and right shift values as shown in FIG. 6(*b*) can be created. That is, the left shift value is a value of reference column+odd columns, and a value of reference column+even columns may correspond to the right shift value. If the reference column is '1', which is the last column of the encryption key, the values of FIG. 6(*b*) can be obtained by creating left shift values and right shift values as shown below in [Equation 1].

Left shift value=1+*a*+*c*+*e*+*g*+*i*+*k*

Right shift value=1+*b*+*d*+*f*+*h*+*j*         [Equation 1]

Figure 7:
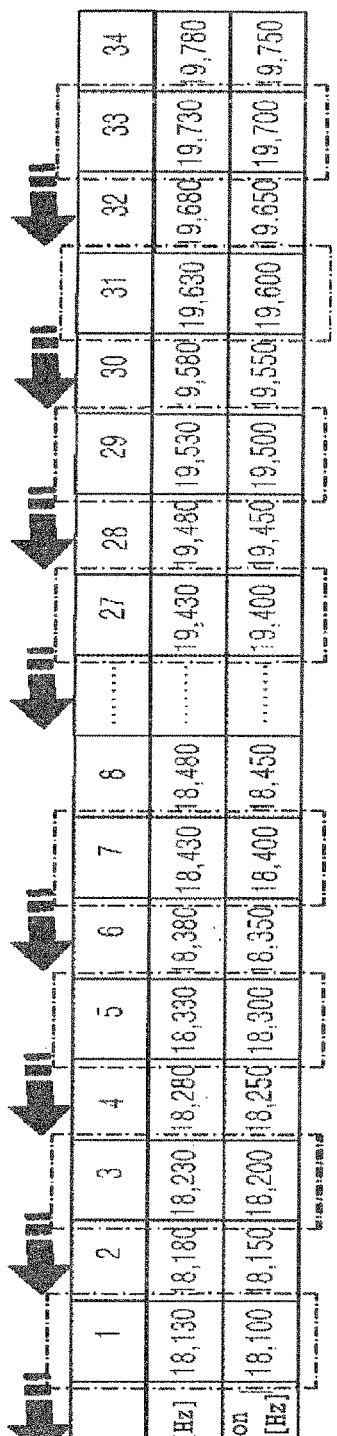
FIG. 7 is a view showing an encryption process accomplished by moving data frequencies using a left shift value according to an embodiment of the present invention.

If the left shift value and the right shift value are created as described above, the odd columns among the places of the frequency block move as much as a corresponding value using the left shift value as shown in FIG. 7, and the frequencies at the moved places are replaced with the frequencies of the columns. However, if a column moves beyond the first place while moving to the left, the column moves to the last place and rotates a loop.

Figure 8:
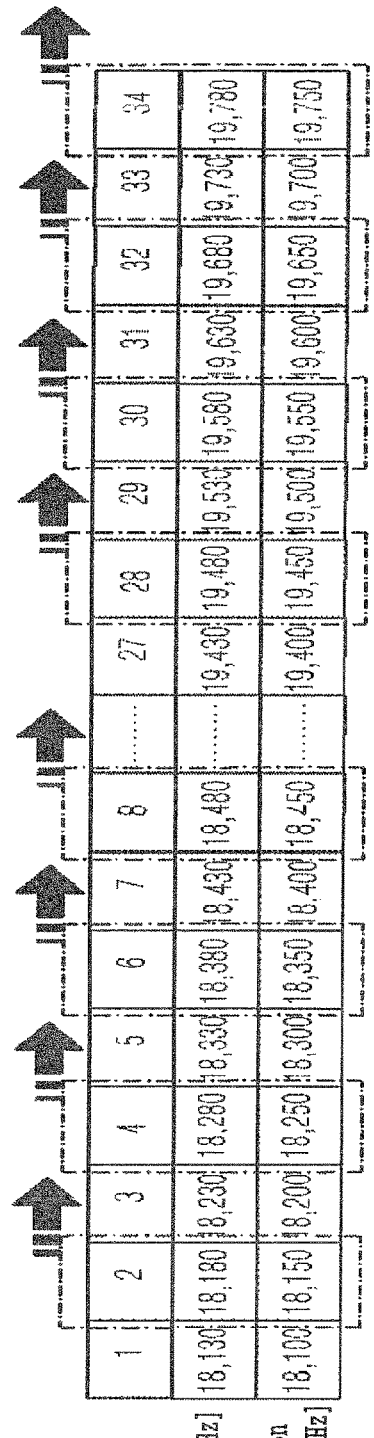
FIG. 8 is a view showing an encryption process accomplished by moving data frequencies using a right shift value according to an embodiment of the present invention.

In the same manner, the even columns among the places of the frequency block move as much as a corresponding value using the right shift value as shown in FIG. 8, and the frequencies at the moved places are replaced with the frequencies of the columns. However, if a column moves beyond the last place while moving to the right, the column moves to the first place and rotates a loop.

The data frequency transmission module 130 converts a data to be transmitted into a binary number, generates data frequencies allocated to data places having a converted value of '1' at the set base decibel level, generates a separate reception filter frequency allocated to a data place corresponding to the number of data having a converted value of '1' at the base decibel level, and generates a correction reference frequency for hardware transmission correction at the base decibel level.

Describing in detail, when it is desired to transmit a decimal data, the decimal data to be transmitted is converted into binary digits after encrypting the frequency block, and if a converted digit is '1', a frequency at a corresponding place is generated. A frequency corresponding to a place of a reception filter frequency is generated by adding the number of frequencies generated in the data frequency block. A frequency placed at the correction value '0' of the correction reference frequency for hardware transmission correction is generated.

For example, when it is desired to transmit a decimal data of '1234', if '1234' is converted into binary digits as shown in FIG. 9, frequencies described below and corresponding to the binary digits 10011010010 are transmitted. In addition, since the number of frequencies generated in the data frequency block is six, a frequency of 18,350 Hz corresponding to the sixth place of the separate reception filter frequency block is transmitted at the base decibel. In addition, a frequency of 18,080 Hz placed at the correction value '0' of the correction reference frequency for hardware transmission correction is generated at the base decibel.

The extracted transmission frequency is created as a sinusoidal wave (sine wave) at the same base decibel and transmitted through a speaker. When the minute of the timer is changed, the transmission frequency is rearranged through the frequency block encryption module 120 and transmitted again.

When it is desired to transmit a hexadecimal data, the hexadecimal data to be transmitted is converted into binary digits after encrypting the frequency block, and if a converted digit is '1', a frequency at a corresponding place is generated. A frequency corresponding to a place of a reception filter frequency is generated by adding the number of frequencies generated in the data frequency block. A frequency placed at the correction value '0' of the correction reference frequency for hardware transmission correction is generated.

For example, when a hexadecimal data of 'F00000F' is transmitted, if the number at each place is converted into binary digits, total seven four-byte binary numbers of 1111, 0000, 0000, 0000, 0000, 0000 and 1111 are created and allocated to the data frequency block as shown in FIG. 10. Then, since the number of frequencies generated in the data frequency block is eight, a frequency of 18,390 Hz corresponding to the eighth place of the separate reception filter frequency block is transmitted at the base decibel. In addition, a frequency of 18,080 Hz placed at the correction value '0' of the correction reference frequency for hardware transmission correction is generated at the base decibel.

Meanwhile, in the description of the configuration of the sound wave transmission unit 100, an example of performing encryption on a frequency block created by the data frequency creation module 110 by the frequency block encryption module 120 and performing frequency transmission for the frequencies allocated to the data places of the encrypted frequency block has been described as an example to which the frequency block encryption module 120 are applied. However, it will be apparent that the present invention is not limited thereto and can be applied to an embodiment of creating a frequency block by the data frequency creation module 110 and directly transmitting data through the data frequency transmission module 130 without encryption.

FIG. 11 is a block diagram showing the configuration of a sound wave reception unit according to an embodiment of the present invention.

The sound wave reception unit 200 of the present invention allows all audio devices (H/W) to be used as a transmitter so as to automatically sense an output error Hz generated according to the characteristic of a speaker or an audio device (H/W) and receive sound wave data when a data frequency is transmitted through the same sound wave communication software.

If the sound wave transmission unit 100 encrypts and transmits a frequency of the frequency block, the sound wave reception unit 200 performs encryption analysis that can analyze the frequency, and at this time, the encryption analysis synchronizes the frequency array the same as that of the sound wave transmission unit 100 in real-time. In addition, a module for separating sound wave data is proposed to receive a sound wave data transmitted from a nearest location when data frequencies of different signals are transmitted from the same location so that several sound wave signals may be used at the same place without crosstalk.

To this end, the sound wave reception unit 200 may include a sound wave data reception module 210, a Fast Fourier Transform module 220, a reception correction module 230, a sound wave data separation module 240 and a validation module 250.

The sound wave data reception module 210 corresponds to a microphone provided in a smart phone or a tablet PC and receives sound wave data of around 10 ms at regular time intervals through such a microphone resource.

The Fast Fourier Transform module 220 extracts decibels by performing Fast Fourier Transform (FFT) on the received sound wave signal at predetermined sampling intervals and allocates the decibels in a sampling frequency array. The Fast Fourier Transform module 220 performs a work of converting a time data into a frequency data by applying a Fast Fourier Transform (FFT) formula to analyze a data frequency transmitted from the sound wave transmission unit 100.

The FFT analysis may convert a time data of a sampling rate of 44100 Hz into a frequency data of 8820 blocks with an interval of 5 Hz. The larger the size of a data transmitted from the sound wave transmission unit 100, the frequency interval is decreased by increasing the number of blocks. The analyzed FFT data only in the frequency band (18000 to 19800 Hz) corresponding to sound wave communication are sequentially stored in the sampling frequency array having the frequency interval as shown in FIG. 12.

The reception correction module 230 determines a frequency detecting the highest decibel in the correction frequency band as a correction frequency and performs reception correction by moving the decibels allocated in the sampling frequency array as much as a correction value allocated to the correction frequency.

The reception correction module 230 is a module developed to receive a correct data unrestrictive to the mechanical characteristics by correcting a frequency error generated by the mechanical (H/W) characteristics of a transmitter. The reception correction module 230 detects a frequency array of a reception correction area from the array analyzed through the Fast Fourier Transform module 220. As shown in tables of FIG. 13, a column detecting the highest decibel value of the reception correction area data is used as a correction value. If the correction value is '0', an encryption analysis module is executed on the FFT analysis original data without applying separate correction logic.

However, if the correction value is not '0', the encryption analysis module is executed after shifting the decibel value of the FFT analysis original data as much as the correction value. For example, if frequency 18,085 Hz has the highest decibel among the frequencies of the reception correction area, it may be assumed that the correction reference frequency of 18,080 Hz has been transmitted after being shifted by 5 Hz. Accordingly, a reception correction of moving the decibel as much as the correction value '−1' allocated to frequency 18,085 Hz is performed as shown in FIG. 14.

A decryption module processes only frequencies of a predetermined reception filter band after blind-processing all the other frequencies through a reception filter. Accordingly, as shown in FIG. 15, only frequencies of a predetermined reception filter band may be extracted and processed as shown in FIG. 15.

The decryption module creates a decryption left shift value and a decryption right shift value using an encryption key, replaces frequencies by moving the frequencies allocated to either the odd columns or the even columns, among the array factors of the sound wave transmission and reception array, to the left side as much as the decryption left shift value, replaces frequencies by moving the frequencies allocated to the columns that have not been moved to the left side, among the array factors of the sound wave transmission and reception array, as much as the decryption right shift value, and then extracts a data frequency and a decibel allocated to the data frequency from the reception corrected sampling frequency array, extracts a separate reception filter frequency and a decibel allocated to the separate reception filter frequencies from the reception corrected sampling frequency array, and arranges the extracted values in the sound wave transmission and reception array.

Figure 16:
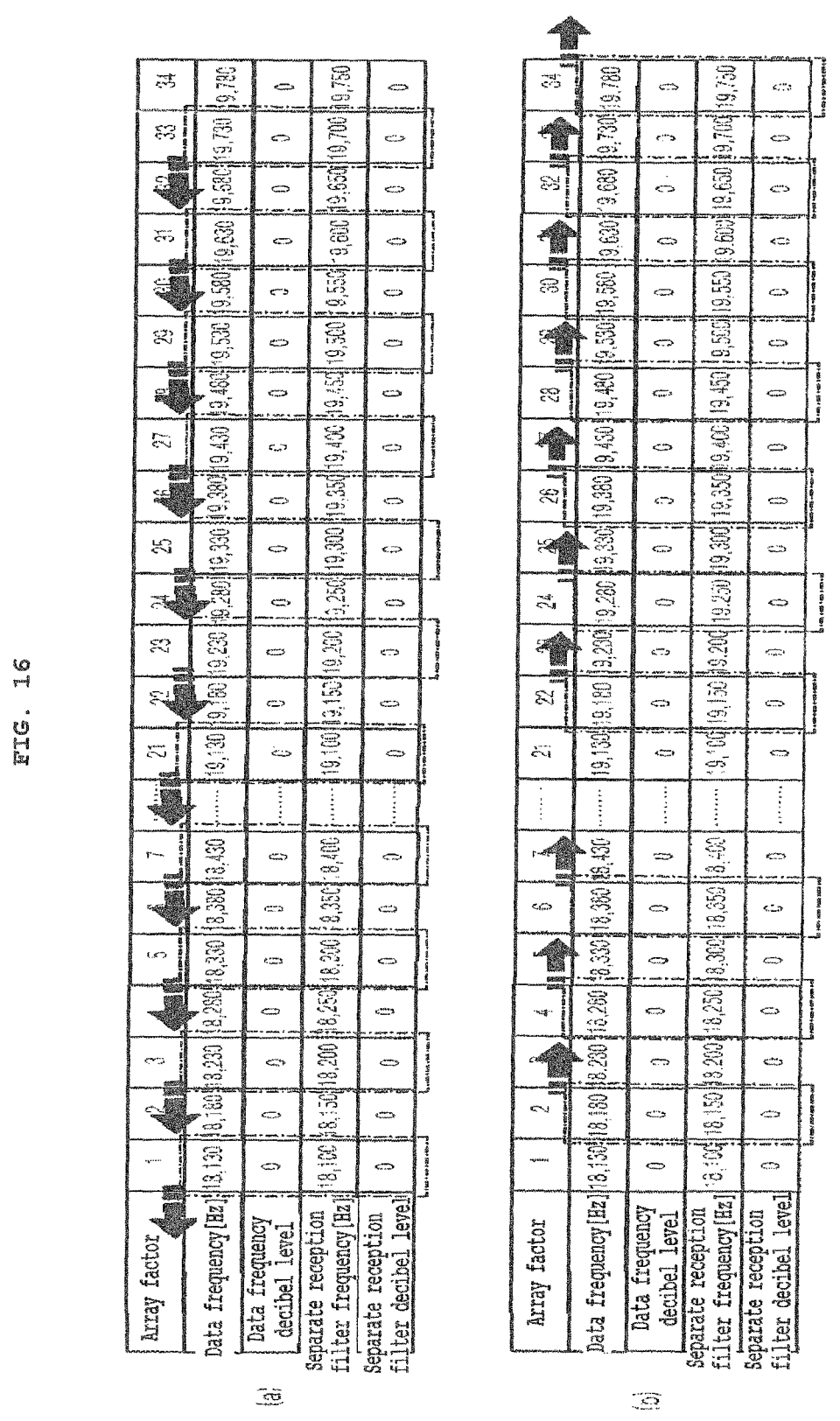
Figure 17:
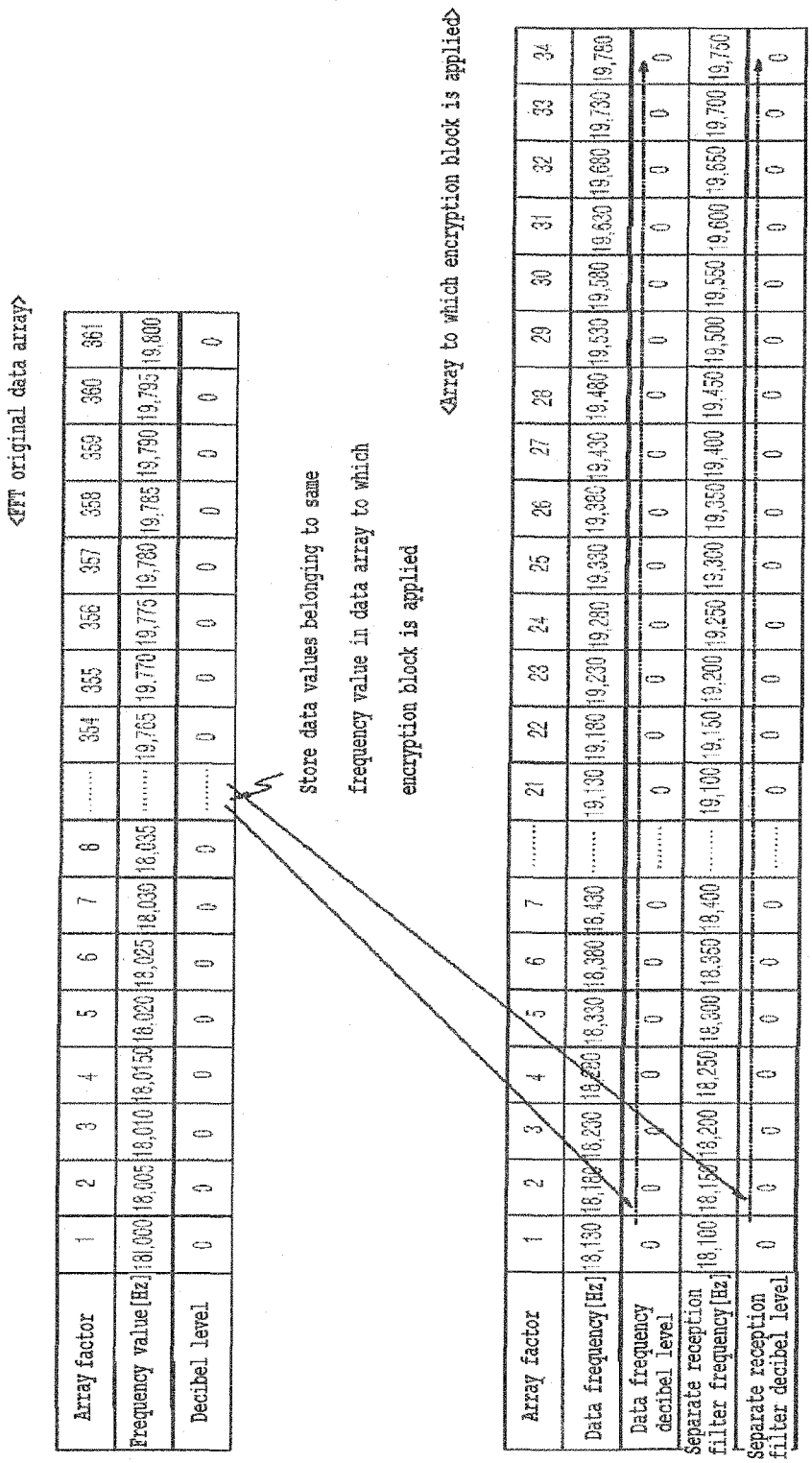
FIG. 17 is a view showing tables storing separate reception filter frequencies extracted from a reception corrected sampling frequency array and decibels allocated to the separate reception filter frequencies according to an embodiment of the present invention.

That is, the decryption module creates an encryption key on the basis of GPS time of a central server, a local server or a smart phone. The encryption key is created in the same manner as the encryption key created by the frequency block encryption module 120 of the sound wave transmission unit 100, and a left shift value and a right shift value are determined by adding specific columns of the created encryption key. Frequencies of the array factors of the odd columns are moved as much as the left shift value as shown in FIG. 16(a) according to the determined left shift value, and in addition, frequencies of the array factors of the even columns are moved as much as the right shift value as shown in FIG. 16(b) according to the determined right shift value. Then, as shown in FIG. 17, separate reception filter frequencies and decibel levels allocated to the separate reception filter frequencies are extracted and stored from the reception corrected sampling frequency array.

For reference, when the decryption is performed, frequencies are moved in the same manner as the transmission unit using the same shift value. In both the encryption and the decryption, only frequencies are moved. If the sound wave transmission unit transmits a frequency of a corresponding block after moving the frequency using the extracted shift value, since the sound wave transmission unit has transmitted the frequency after moving the frequency to a specific block using a corresponding key value, the decryption module of the sound wave reception unit 200 also moves and allocates the frequency to a block using the same shift value and analyzes the received frequency after marking the frequency in a corresponding block.

As shown in FIG. 18, the sound wave data separation module 240 restores data by extracting a separate reception filter frequency having the highest decibel among the decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency.

Although an existing sound wave communication cannot receive a data since it does not have a reference for separating data when different signals are generated in the same region due to the characteristic of sound waves, the present invention may receive a signal transmitted from a nearest location through the sound wave data separation module.

For example, if a separate reception filter frequency having the highest decibel among the decibels allocated to the separate reception filter frequencies is 18,350 Hz, six array factors can be extracted in order of having the highest value of decibel among the decibels of the data frequencies. Accordingly, as shown in FIG. 9, when a total data of '100110100100' configured of '10001101001'(data)+'00' (parity) including '00' as parity bits is transmitted, the separate reception filter frequency extracts array factors of 22, 25, 26, 28, 31 and 34, and '100110100100' may be received as a reception data.

For reference, a factor value of an array factor having the highest decibel value of the separate reception filter frequency is a value of the number of frequency data received from a transmitter transmitting the data from a nearest location. In the present invention, since the sound wave transmission unit 100 transmits a data frequency at a constant base decibel, if frequency data are received as many as a value of the array factors extracted in descending order of decibel values of the data frequencies, a data transmitted from a nearest location can be received.

Data extraction reference value: $n$=array factor of Max(reception filter decibel)

Data extraction: data[$n$]=top $n$ data of Max(data frequency decibel)

The validation module 250 performs validation of the restored data using the parity bit in the data restored through the sound wave data separation module 240.

The validation is performed such that if the number of frequencies marked as an odd block among the frequency blocks 1 to 32 of the data area is an odd number, the frequency of block 33 should be simultaneously received. If a frequency corresponding to block 33 is not received although the number of frequencies is an odd number, this is recognized as a data reception error, and the data is received and analyzed again. Such an analysis can be performed, for example, five times in total.

In addition, in the same validation manner, if the number of frequencies marked as an even block among the frequency blocks 1 to 32 of the data area is an even number, the frequency of block 34 should be simultaneously received. If a frequency corresponding to block 34 is not received although the number of frequencies is an even number, this is recognized as a data reception error, and the data is received and analyzed again. Such an analysis can be performed, for example, five times in total. For reference, if an error occurs during the validation and accumulated a predetermined number of times (e.g., five times in total), the validation module is suspended for a predetermined time period and receives data again.

Meanwhile, in the description of the configuration of the sound wave reception unit 200, an example including decryption performed when a data with an encrypted frequency block is received has been described. As an example to which the frequency block encryption module is applied, an example of performing encryption on a frequency block created by the data frequency creation module 110 by the frequency block encryption module 120 and performing frequency transmission for the frequencies allocated to the data places of the encrypted frequency block has been described. However, it will be apparent that the present invention is not limited thereto and also can be applied when the data frequency creation module 110 directly transmits data through the data frequency transmission module 130 without encryption of the frequency block and the sound wave reception unit 200 receives the data and performs a restoration process without decryption.

Figure 19:
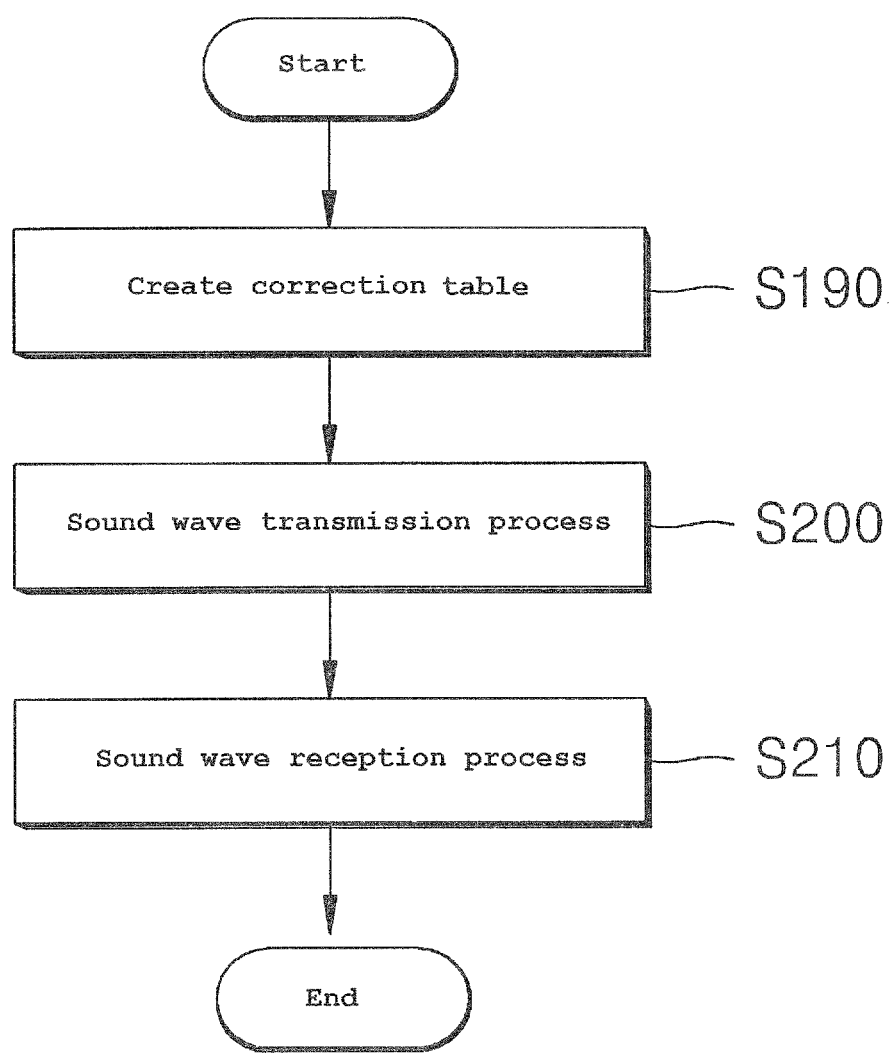
FIG. 19 is a flowchart illustrating a sound wave communication process according to an embodiment of the present invention.
Figure 20:
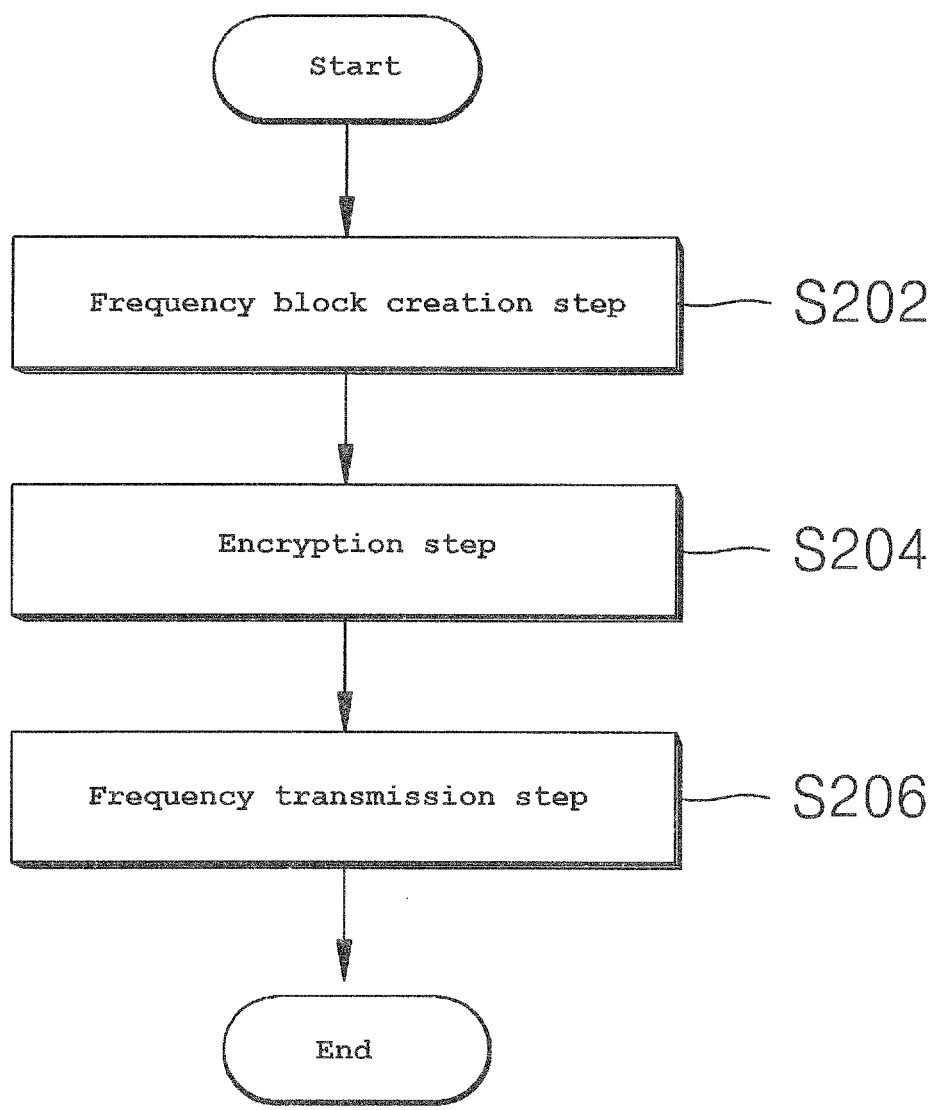
FIG. 20 is a flowchart illustrating a sound wave transmission process according to an embodiment of the present invention.
Figure 21:
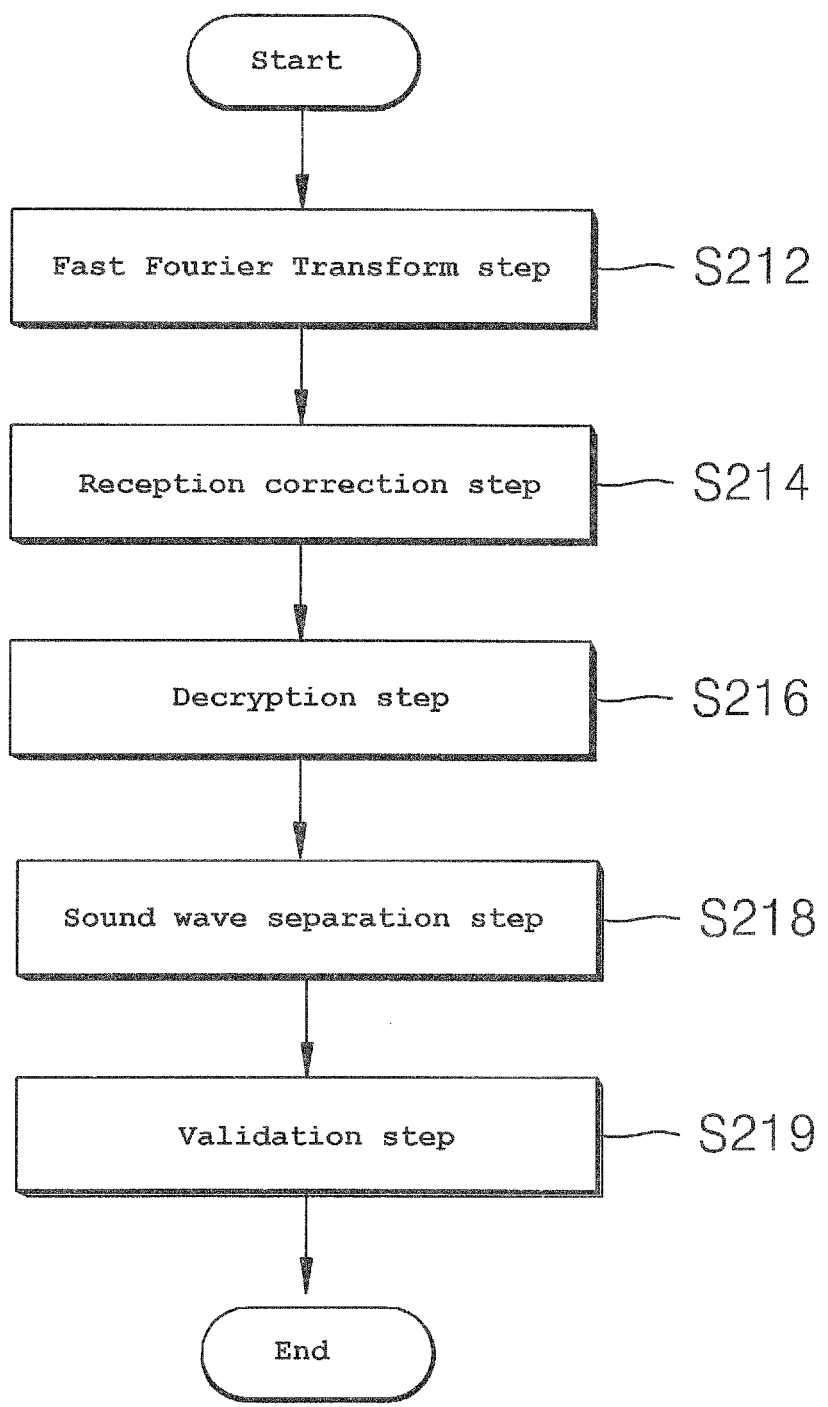
FIG. 21 is a flowchart illustrating a sound wave reception process according to an embodiment of the present invention.

FIG. 19 is a flowchart illustrating a sound wave communication process according to an embodiment of the present invention, FIG. 20 is a flowchart illustrating a sound wave transmission process according to an embodiment of the present invention, and FIG. 21 is a flowchart illustrating a sound wave reception process according to an embodiment of the present invention.

A sound wave communication process of the present invention may have a hardware correction table creation process (S190), a sound wave transmission process (S200), and a sound wave reception process (S210).

The hardware correction table creation process (S190) is a process of setting a correction frequency band in which a correction frequency is allocated to each correction value for correcting an error according to the hardware characteristic of a speaker transmitting a sound wave and creating a hardware correction table by allocating a correction reference frequency to correction value '0'.

When a sound wave signal is transmitted, sound waves may be transmitted on another frequency having a slight error, not the originally set reference frequency, according to the hardware characteristic, and the same hardware correction table is provided in both the sound wave transmission unit 100 and the sound wave reception unit 200 to correct the error according to the hardware characteristic. A correction frequency allocated to correction value '0' will be referred to as a correction reference frequency. An example of the hardware correction table is shown in FIG. 2. Referring to FIG. 2, it is understood that a correction frequency band has a band of 18,065 to 18,095 Hz and has a correction value of 3 at 18,065 Hz, a correction value of 2 at 18,070 Hz, a correction value of 1 at 18,075 Hz, a correction value of 0 at 18,080 Hz, a correction value of −1 at 18,085 Hz, a correction value of −2 at 18,090 Hz, and a correction value of −3 at 18,095 Hz since the correction frequency is allocated every 5 Hz. Accordingly, 18,080 Hz having a correction value of 0 corresponds to the correction reference frequency.

The sound wave transmission process (S200) is a process of creating a data frequency block for allocating a data to each data frequency and creating a separate reception filter frequency block for receiving a data loaded on a sound wave transmitted from a nearest location when the sound wave is received.

Describing the sound wave transmission process (S200) in detail with reference to FIG. 20, it may have a frequency block creation step (S202), an encryption step (S204), and a frequency transmission step (S206).

The frequency block creation step (S202) is a step of creating a sound wave transmission and reception array having the number of data places adding the number of binary transmission data and the number of parity bits as an array factor, creating a data frequency block allocating different data frequencies having regular intervals to the data places, and creating a separate reception filter frequency block allocating different separate reception filter frequencies to the data places. For example, as shown in FIG. 4, the process creates a sound wave transmission and reception array having an array factor of thirty four data places adding thirty two binary transmission data and two parity bits and allocates a data frequency and a separate reception filter frequency to each data place.

The frequency block creation step has an encryption step of creating an encryption key, creating an encryption left shift value and an encryption right shift value using the encryption key, replacing frequencies by moving the frequencies allocated to the odd columns, among the data places of the frequency block configured of a data frequency block and a separate reception filter frequency block, to the left side as much as the encryption left shift value, and replacing frequencies by moving the frequencies allocated to the even columns among the data places of the frequency block to the right side as much as the encryption right shift value. That is, an encryption key is created using a time of a central server or a local server in combination of year+month+day+hour+minute. A transmitter through an independent H/W sound wave generator creates an encryption key using a time of an embedded timer in combination of year+month+day+hour+minute. The encryption key is created by combining time components of a timer embedded in the sound wave transmission unit 100 or time components of a server connected to a network. For example, the encryption key may have a format of YYYYMMDDhhmm (201504271202).

The frequency block creation step calculates the encryption left shift value by adding either the odd columns or the even columns of the encryption key and creates the encryption right shift value by adding the other columns of the encryption key.

If the left shift value and the right shift value are created as described above, the odd columns among the places of the frequency block move as much as a corresponding value using the left shift value as shown in FIG. 7, and the frequencies at the moved places are replaced with the frequencies of the columns. However, if a column move beyond the first place while moving to the left, the column moves to the last place and rotates a loop. In the same manner, the even columns among the places of the frequency block move as much as a corresponding value using the right shift value as shown in FIG. 8, and the frequencies at the moved places are replaced with the frequencies of the columns. However, if a column move beyond the last place while moving to the right, the column moves to the first place and rotates a loop.

After performing the encryption step (S204), the frequency transmission step (S206) is performed to convert a data to be transmitted into a binary number, generate data frequencies allocated to data places having a converted value of '1' at the set base decibel level, generate a separate reception filter frequency allocated to a data place corresponding to the number of data having a converted value of '1' at the base decibel level, and generate a correction reference frequency for hardware transmission correction at the base decibel level.

That is, as shown in FIG. 9 of converting a decimal data into a binary data and generating a frequency loaded with the data and FIG. 10 of converting a hexadecimal data into a binary data and generating a frequency loaded with the data, a data frequency allocated to a data place having a value of '1' is transmitted at the base decibel level, and a separate reception filter frequency and a correction reference frequency are transmitted at the base decibel level.

Meanwhile, in the description of the sound wave transmission process (S200), an example of performing frequency block encryption on a frequency block and performing frequency transmission for a frequency allocated to a data place of the encrypted frequency block has been described. However, the present invention is not limited thereto and may create a frequency block and directly transmit data through data frequency transmission without encryption.

Meanwhile, after sound wave transmission has been performed as described above, the counterpart performs the sound wave reception process (S210). The sound wave reception process (S210) is a process of receiving a sound wave signal transmitted from the sound wave transmission unit 100, extracting a decibel for each data frequency to arrange the decibel in an array, performing correction by shifting the array as much as the extracted correction value using the hardware correction table, and restoring data by extracting array factors in descending order of decibels of the data frequencies, as many as the number of array factors allocated to the separate reception filter frequency having the highest decibel from a band of separate reception filter frequencies.

Describing the sound wave reception process (S210) in detail with reference to FIG. 21, it may have a Fast Fourier Transform step (S212), a reception correction step (S214), a decryption step (S216), and a sound wave separation step (S218). Other than these, it may have a validation step (S219).

The Fast Fourier Transform step (S212) is a step of extracting decibels by performing Fast Fourier Transform (FFT) on the received sound wave signal at predetermined sampling intervals and allocating the decibels in a sampling frequency array.

The FFT analysis may convert a time data of a sampling rate of 44100 Hz into a frequency data of 8820 blocks with an interval of 5 Hz. The larger the size of a data transmitted from the sound wave transmission unit 100, the frequency interval is decreased by increasing the number of blocks. The analyzed FFT data only in the frequency band (18000 to 19800 Hz) corresponding to sound wave communication are sequentially stored in the sampling frequency array having the frequency interval as shown in FIG. 12.

The reception correction step (S214) determines a frequency detecting the highest decibel in the correction frequency band as a correction frequency and performs reception correction by moving the decibels allocated in the sampling frequency array as much as a correction value allocated to the correction frequency. As shown in tables of FIG. 13, a column detecting the highest decibel value of the reception correction area data is used as a correction value. If the correction value is '0', an encryption analysis module is executed on the FFT analysis original data without applying separate correction logic. However, if the correction is not '0', the encryption analysis module is executed after shifting the decibel value of the FFT analysis original data as much as the correction value. For example, if frequency 18,085 Hz has the highest decibel level among the frequencies of the reception correction area, it may be assumed that the correction reference frequency of 18,080 Hz has been transmitted after being shifted by 5 Hz. Accordingly, a reception correction of moving the decibel as much as the correction value '−1' allocated to frequency 18,085 Hz is performed as shown in FIG. 14.

The decryption step (S216) creates a decryption left shift value and a decryption right shift value using an encryption key, replaces frequencies by moving the frequencies allocated to the odd columns, among the array factors of the sound wave transmission and reception array, to the left side as much as the decryption left shift value, replaces frequencies by moving the frequencies allocated to the even columns, among the array factors of the sound wave transmission and reception array, as much as the decryption right shift value, and then extracts a data frequency and a decibel allocated to the data frequency from the reception corrected sampling frequency array, extracts a separate reception filter frequency and a decibel allocated to the separate reception filter frequencies from the reception corrected sampling frequency array, and arranges the extracted values in the sound wave transmission and reception array.

In the decryption step (S216), the encryption key is created in the same manner as the encryption key created by the frequency block encryption module 120 of the sound wave transmission unit 100, and a left shift value and a right shift value are determined by adding specific columns of the created encryption key. Frequencies of the array factors of the odd columns are moved as much as the left shift value as shown in FIG. 16(*a*) according to the determined left shift value, and in addition, frequencies of the array factors of the even columns are moved as much as the right shift value as shown in FIG. 16(*b*) according to the determined right shift value. Then, as shown in FIG. 17, separate reception filter frequencies and decibel levels allocated to the separate reception filter frequencies are extracted and stored from the reception corrected sampling frequency array.

The sound wave separation step (S218) restores data by extracting a separate reception filter frequency having the highest decibel among the decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency. For example, as shown in FIG. 18, the data is restored by extracting a separate reception filter frequency having the highest decibel among the decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency. Although an existing sound wave communication cannot receive a data since it does not have a reference for separating data when different signals are generated in the same region due to the characteristic of sound waves, the present invention may receive a signal transmitted from a nearest location through the sound wave data separation module.

The reception data separated and restored from the sound wave data may additionally have a validation step (S219). The validation step (S219) performs validation of the restored data using the parity bit in the data restored through the sound wave data separation module 240.

The validation is performed such that if the number of frequencies marked as an odd block among the frequency blocks 1 to 32 of the data area is an odd number, the frequency of block 33 should be simultaneously received. If a frequency corresponding to block 33 is not received although the number of frequencies is an odd number, this is recognized as a data reception error, and the data is received and analyzed again. In addition, in the same validation manner, if the number of frequencies marked in the even blocks among the frequency blocks 1 to 32 of the data area is an even number, a frequency of block 34 should be simultaneously received. If a frequency corresponding to block 34 is not received although the number of frequencies is an even number, this is recognized as a data reception error, and the data is received and analyzed again. Such an analysis can be performed, for example, five times in total.

In the embodiments of the present invention described above, although the most preferable examples, among various possible embodiments, are selected and presented to aid understanding of those skilled in the art, the technical spirits of the present invention are not necessarily limited or restricted by the embodiments, and various changes, modifications and other equivalent embodiments can be made without departing from the spirits of the present invention.

The invention claimed is:

1. A sound wave communication system comprising:
   a hardware correction table for setting a correction frequency band, in which a correction frequency is allocated to each correction value for correcting an error according to a hardware characteristic of a speaker, and allocating a correction reference frequency to correction value '0';
   a sound wave transmitter configured to generate data frequencies allocated to data places at a predetermined base decibel level, to generate a separate reception filter frequency, at the base decibel level, to generate the correction reference frequency for hardware transmission correction at the base decibel level, and to transmit, through the speaker, sound waves on which the data frequencies, the separate reception filter frequency, and the correction reference frequency are loaded; and
   a sound wave receiver configured to receive through a microphone the sound waves transmitted from the sound wave transmitter, to extract a decibel for each data frequency to arrange the decibel in an array, to perform correction by shifting the array as much as the extracted correction value using the hardware correction table, and to restore data by extracting array factors in descending order of decibels of the data frequencies, as many as the number of array factors allocated to the separate reception filter frequency having a highest decibel from a band of separate reception filter frequencies, wherein the separate reception filter frequency is configured for the sound wave receiver to receive a data loaded on a sound wave transmitted from a nearest location when the sound waves are received through the microphone.

2. The system according to claim 1, wherein the sound wave transmitter is further configured:
   to create a sound wave transmission and reception array having the number of data places adding the number of binary transmission data and the number of parity bits as an array factor, to create a data frequency block allocating different data frequencies having regular intervals to the data places, and to create a separate reception filter frequency block allocating different separate reception filter frequencies to the data places; and
   to convert a data to be transmitted into a binary number, to generate data frequencies allocated to data places having a converted value of '1' at the set base decibel level, to generate a separate reception filter frequency allocated to a data place corresponding to the number of data having a converted value of '1' at the base decibel level, and to generate a correction reference frequency for hardware transmission correction at the base decibel level.

3. The system according to claim 2, wherein the sound wave transmitter is further configured to encrypt a frequency block by creating an encryption key, creating an encryption left shift value and an encryption right shift value using the created encryption key, replacing frequencies by moving frequencies allocated to odd columns, among data places of the frequency block configured of a data frequency block and a separate reception filter frequency block, to a left side as much as the encryption left shift value, and replacing frequencies by moving frequencies allocated to even columns among the data places of the frequency block to a right side as much as the encryption right shift value,
   wherein the sound wave transmitter is further configured to perform frequency transmission for the frequencies allocated to the data places of the encrypted frequency block.

4. The system according to claim 3, wherein the encryption key is created by combining time components of a timer embedded in the sound wave transmitter or time components of a server connected to a network, and the encryption left shift value is calculated by adding either the odd columns or the even columns of the encryption key, and the encryption right shift value is created by adding the other columns of the encryption key.

5. The system according to claim 2, wherein a separate reception filter frequency allocated to an N-th data place is a frequency in a middle between a data frequency allocated to an N−1-th data place and a data frequency allocated to an N+1-th data place.

6. The system according to claim 3, wherein the sound wave receiver is further configured:
   to extract decibels by performing Fast Fourier Transform (FFT) on the received sound waves at predetermined sampling intervals and allocating the decibels in a sampling frequency array;
   to determine a frequency detecting a highest decibel in the correction frequency band as a correction frequency and to perform reception correction by moving decibels allocated in the sampling frequency array as much as a correction value allocated to the correction frequency;
   to create a decryption left shift value and a decryption right shift value using the encryption key, to replace frequencies by moving frequencies allocated to the odd columns, among array factors of the sound wave transmission and reception array, to a left side as much as the decryption left shift value, to replace frequencies by moving frequencies allocated to the even columns, among the array factors of the sound wave transmission and reception array, as much as the decryption right shift value, and then to extract a data frequency and a decibel allocated to the data frequency from the reception corrected sampling frequency array, to extract a separate reception filter frequency and a decibel allocated to the separate reception filter frequencies from the reception corrected sampling frequency array, and to arrange the extracted values in the sound wave transmission and reception array; and to restore data by extracting a separate reception filter frequency having a highest decibel among decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency.

7. The system according to claim 6, wherein the sound wave receiver is further configured to perform validation of the restored data using a parity bit in the data restored through the sound wave receiver.

8. A sound wave communication method comprising:

a hardware correction table creation process of setting a correction frequency band in which a correction frequency is allocated to each correction value for correcting an error according to a hardware characteristic of a speaker transmitting a sound wave and creating a hardware correction table by allocating a correction reference frequency to correction value '0';

a sound wave transmission process of creating a data frequency block for allocating a data to each data frequency, creating a separate reception filter frequency block, and transmitting, by a sound wave transmitter through the speaker, sound waves on which the data frequency block and the separate reception filter frequency block are loaded; and a sound waves reception process of receiving the sound waves transmitted from the speaker through a microphone, extracting a decibel for each data frequency to arrange the decibel in an array, performing correction by shifting the array as much as an extracted correction value using the hardware correction table, and restoring data by extracting array factors in descending order of decibels of the data frequencies, as many as the number of array factors allocated to a separate reception filter frequency having a highest decibel among a band of separate reception filter frequencies wherein the separate reception filter frequency block is configured for a sound wave receiver to receive a data loaded on a sound wave transmitted from a nearest location when the sound waves are received through the microphone.

9. The method according to claim 8, wherein the sound wave transmission process includes:

a frequency block creation step of creating a sound wave transmission and reception array having the number of data places adding the number of binary transmission data and the number of parity bits as an array factor, creating a data frequency block allocating different data frequencies having regular intervals to the data places, and creating a separate reception filter frequency block allocating different separate reception filter frequencies to the data places; and a frequency transmission step of converting a data to be transmitted into a binary number, generating data frequencies allocated to data places having a converted value of '1' at a set base decibel level, generating a separate reception filter frequency allocated to a data place corresponding to the number of data having a converted value of '1' at the base decibel level, and generating a correction reference frequency for hardware transmission correction at the base decibel level.

10. The method according to claim 9, further comprising, between the frequency block creation step and the frequency transmission step, an encryption step of encrypting by creating an encryption key, creating an encryption left shift value and an encryption right shift value using the created encryption key, replacing frequencies by moving frequencies allocated to odd columns, among data places of a frequency block configured of a data frequency block and a separate reception filter frequency block, to a left side as much as the encryption left shift value, and replacing frequencies by moving frequencies allocated to even columns among the data places of the frequency block to a right side as much as the encryption right shift value, wherein the frequency transmission step is performed for frequencies allocated to data places of the encrypted frequency block.

11. The method according to claim 10, wherein the sound wave reception process includes:

a Fast Fourier Transform step of extracting decibels by performing Fast Fourier Transform (FFT) on the received sound waves at predetermined sampling intervals and allocating the decibels in a sampling frequency array;

a reception correction step of determining a frequency detecting a highest decibel in the correction frequency band as a correction frequency and performing reception correction by moving decibels allocated in the sampling frequency array as much as a correction value allocated to the correction frequency;

a decryption step of creating a decryption left shift value and a decryption right shift value using the encryption key, replacing frequencies by moving frequencies allocated to the odd columns, among array factors of the sound wave transmission and reception array, to a left side as much as the decryption left shift value, replacing frequencies by moving frequencies allocated to the even columns, among the array factors of the sound wave transmission and reception array, as much as the decryption right shift value, and then extracting a data frequency and a decibel allocated to the data frequency from the reception corrected sampling frequency array, extracting a separate reception filter frequency and a decibel allocated to the separate reception filter frequencies from the reception corrected sampling frequency array, and arranging the extracted values in the sound wave transmission and reception array; and a sound wave data separation step of restoring data by extracting a separate reception filter frequency having a highest decibel among decibels allocated to the separate reception filter frequencies from the decrypted sound wave transmission and reception array, and extracting array factors in descending order of decibels of the data frequencies, as many as the number of array factors of the sound wave transmission and reception array allocated to the extracted separate reception filter frequency.

12. The method according to claim 11, further comprising, after the sound wave data separation step, a validation step of performing validation of the restored data using a parity bit in the data restored through the sound wave data separation step.

\* \* \* \* \*